UNITED STATES PATENT OFFICE.

W. R. THOMAS AND MORGAN EMANUEL, JR., OF CATASAUQUA, PA.

IMPROVED BLASTING-POWDER.

Specification forming part of Letters Patent No. 34,654, dated March 11, 1862; Reissue No. 1,436, dated March 17, 1863.

*To all whom it may concern:*

Be it known that we, W. R. THOMAS and MORGAN EMANUEL, Jr., both of Catasauqua, in the county of Lehigh and State of Pennsylvania, have invented a new and useful Improvement in the Composition of Blasting-Powder; and we hereby declare the following to be a full, clear, and exact description of the same.

It has long been known that chlorate of potash might be used as a substitute for the nitrate of potash in the composition of gunpowder. The former salt gives off its oxygen so readily and in such large quantities that the powder formed by means thereof possesses great energy, and its substitution would be of the greatest value were it not for the fact that the powder thus formed has been found dangerous in its use in consequence of its liability to explode by mere percussion or friction. We have discovered that by mingling it in proper proportions with certain other ingredients this too-great tendency to explode is counteracted, and a powder may thus be formed not only cheaper but more efficient than that which is compounded from the ordinary ingredients.

The following are the ingredients we generally use, and in about the proportions indicated, to wit: nitrate of soda, three and one-half pounds; flowers of sulphur, one and one-quarter pound; ground bark, four and one-half pounds; chlorate of potash, two pounds; water, three quarts. The water should be heated to the boiling-point, and the nitrate of soda and chlorate of potash dissolved therein. While the solution is hot, the bark should be introduced and stirred until it is perfectly saturated. Then add the sulphur and stir till the whole is well mixed, after which the compound only requires to be well dried to make it ready for use.

Instead of the ground bark sawdust, rotten wood, or other equivalent unburned carbonaceous matter may be used. The proportions above indicated may also be varied to a considerable extent without depriving the powder of its useful properties; nor do we regard it as indispensable that the water should be heated as described. We prefer, however, the ingredients above enumerated in something near the proportions there set forth and manipulated as above described.

We do not claim the use of chlorate of potash as an ingredient in the composition of an explosive powder, as we are aware that this ingredient has already been used for that purpose. We are also aware that a valuable blasting-powder has been compounded by the use of the other ingredients now proposed to be used by us with the exception of the chlorate of potash Such a composition was patented by us on the 9th of April, 1861. The patent we are now seeking is an improvement upon that just mentioned, and is intended to be subordinate to it. By means of the combination now proposed an explosive powder may be compounded which shall unite the properties of cheapness, safety, and energy in a greater degree than any heretofore known, as far as we know or believe.

What, therefore, we claim as new, and desire to secure by Letters Patent, is—

1. The use of chlorate of potash with nitrate of soda and ground bark or its equivalent in the formation of an explosive powder, substantially as above set forth.

2. An explosive powder compounded of nitrate of soda, sulphur, chlorate of potash, and ground bark or its equivalent, substantially in the manner and for the purpose above set forth.

WILLIAM R. THOMAS.
MORGAN EMANUEL, JR.

Witnesses:
CHAS. CORWIN,
DANIEL MILRUN.